United States Patent
Sawai

[19]

[11] Patent Number: 5,548,567
[45] Date of Patent: Aug. 20, 1996

[54] AUTOMATIC DISK PLAYER WITH STACKABLE DISK STORAGE BOXES

[75] Inventor: Kunio Sawai, Daito, Japan

[73] Assignee: Funai Electric Co., Ltd., Daito, Japan

[21] Appl. No.: 419,838

[22] Filed: Apr. 11, 1995

Related U.S. Application Data

[63] Continuation of Ser. No. 68,258, May 27, 1993, abandoned.

[30] Foreign Application Priority Data

| May 27, 1992 | [JP] | Japan | 4-160172 |
| Oct. 13, 1992 | [JP] | Japan | 4-077794 |
| Oct. 13, 1992 | [JP] | Japan | 4-077795 |
| Oct. 14, 1992 | [JP] | Japan | 4-077796 |
| Oct. 15, 1992 | [JP] | Japan | 4-078101 |
| Oct. 16, 1992 | [JP] | Japan | 4-078465 |
| Oct. 16, 1992 | [JP] | Japan | 4-078466 |
| Oct. 16, 1992 | [JP] | Japan | 4-078468 |
| Oct. 16, 1992 | [JP] | Japan | 4-304663 |
| Oct. 19, 1992 | [JP] | Japan | 4-078854 |
| Oct. 19, 1992 | [JP] | Japan | 4-078856 |

[51] Int. Cl.⁶ ................................ G11B 17/26
[52] U.S. Cl. ............ 369/36; 369/192; 360/98.05
[58] Field of Search .................. 369/34, 35, 36, 369/37, 38, 39, 178, 192, 75.1, 191, 194, 195, 196, 75.2, 193; 360/98.04, 98.05, 98.06

[56] References Cited

U.S. PATENT DOCUMENTS

| 4,675,856 | 6/1987 | Rudy et al. | 369/36 |
| 4,945,430 | 7/1990 | Konishi et al. | 360/98.05 |
| 5,022,020 | 6/1991 | Langman et al. | 369/192 |
| 5,119,354 | 6/1992 | Umesaki | 369/36 |
| 5,124,855 | 6/1992 | Dew et al. | 360/97.02 |
| 5,206,845 | 4/1993 | Baxter et al. | 369/36 |
| 5,247,406 | 9/1993 | Apple et al. | 360/98.04 |
| 5,285,333 | 2/1994 | Barr et al. | 360/98.06 |
| 5,373,489 | 12/1994 | Sato et al. | 369/36 |

FOREIGN PATENT DOCUMENTS

| 57-183662 | 11/1982 | Japan | 369/39 |
| 61-59660 | 3/1986 | Japan | 369/194 |
| 63-16459 | 1/1988 | Japan . | |
| 63-217563 | 9/1988 | Japan | 369/178 |
| 1-146162 | 6/1989 | Japan | 369/191 |

*Primary Examiner*—Stuart S. Levy
*Assistant Examiner*—Kevin M. Watkins
*Attorney, Agent, or Firm*—Lackenbach Siegel Marzullo Aronson & Greenspan

[57] ABSTRACT

A storage box or device for a large number of disks such as optical disks to be stored therein, and also for enabling a disk player having an automatic disk exchanger to be played while being stored in said storage box. The device comprises a plurality of disk storage boxes and a base box with disk storage boxes stacked in series thereon. The disk storage box has a stocker portion enabling multiple disk trays to be stored retractively therein, and tray-retracting devices installed in each storage portion of said stocker portion and a spaced portion placed behind said stocker portion, enabling a disk regenerating device carrier to move vertically therein. The base boxes are provided with an ampliting portion having an electrical system including a controller for the automatic exchanger; and the regenerating device is mounted on the carrier so as to be horizontally movable in the spaced portion and the carrier is activated to move vertically in the spaced portion.

17 Claims, 17 Drawing Sheets

AUTOMATIC DISK PLAYER WITH STACKABLE DISK STORAGE BOXES

This application is a continuation, division, of application Ser. No. 08/068,258, filed May 27, 1993 now abandoned.

BACKGROUND OF THE INVENTION

This invention relates to a disk player having an automatic disk exchanger comprising a plural of disk storage boxes stacked in series so as to enlarge the storage capacity for storing optical disks such as CDs, LDs and the like, and enabling pre-selected disks stored in a stocker of said storage boxes to be automatically selected and played.

Up to the present, generally a plurality of said optical disks are stored in a box or shelf like a book box, each inserted in its own jacket, it being customary to remove said disk from the jacket and put it on a disk-playing device, or to place a few pre-selected disks taken out from their jackets into a conventional auto changer which stores and plays about five disks, then to set them on said playing device.

Recently, because of the popularization of said optical disks in many homes, and the rapid increase in the number of them, it has become cumbersome to maintain them in order, resulting in a tendency to leave them in random piles and stored only in their jackets.

Due to the above tendency, the enjoyment of playing said disks was reduced by half, and there also arose the possibility of buying the same disk twice or abandoning them without repeated using.

In consideration of the above mentioned problems, this invention was completed to provide a disk player having an automatic disk exchanger enabling said disk to be played while being stored in stacked storage boxes having large storing capacities.

SUMMARY OF THE INVENTION

A storage box for storing said disks according to this invention is characterized by: a stocker having multiple stages of storing portions enabling each disk-carrying tray to be stored rectractively therein; tray-retracting means provided in each of said storing portions; an opening provided behind said stocker enabling a disk-playing device to move horizontally and vertically therein; said opening having opened upper and bottom ends; and said opening having rack members fixed on both inner side walls thereof for guiding the vertical movement of said disk-playing device.

Furthermore, said disk player having an automatic disk exchanger characterized by a base box installed with an electrical system for controlling said automatic disk exchanger; and a plurality of said storage boxes stacked in series on said base box.

According to the present invention, said disk taken from its jacket is stored in said disk-carrying tray provided in each of said storing portions of said stocker. Said stocker is composed of multiple stages of said storing portions, and the number of disks corresponding to the numbers of said storing portions are stored therein.

Also according to the present invention, when said storage boxes are stacked in series on said base box, said openings penetrate each other, said disk-playing device is vertically movable through all stacked boxes, and it is accordingly possible to regenerate each disk stored in said storage box.

Furthermore, according to the present invention, it is possible to successively play said multiple disks stored in said stacked storage boxes and to increase the disk-storing capacity by increasing the number of storage boxes.

Furthermore, a disk-retracting means which retracts said disk-carrying tray is composed of a roller installed near the disk entrance port of said disk-playing device and a disk-detecting means which detects the insertion of said disk into said entrance port. When said tray moves towards said disk-playing device and said disk placed on said tray is inserted into said disk entrance port in said device, said disk detecting-means detects said disk and rotates said roller, then said disk is finally inserted into said disk-playing device by coming into contact with said running roller. After playing, said disk is returned to said tray by the reverse rotation of said roller.

In another embodiment according to the present invention, said disk player is composed of a stocker having a storing portion enabling said disk-carrying tray to be retractably stored, a disk-playing device enabling said disk placed on said tray to play, a chassis anti-vibrationally supporting said disk-playing device, a disk-playing device carrier enabling said chassis to move vertically and horizontally, characterized in that said disk-playing device is supported by said chassis through vibration-preventing members. As said disk-playing device is supported in said chassis with said vibration-preventing members, even if the floor supporting said storage boxes receives vibrational shocks, and said storage boxes, said disk-playing device carrier or said chassis vibrate, said vibrational shocks are absorbed by said vibration-preventing members, and said disk-playing device does not suffer from said vibrational shocks.

According to the present invention, said disk-retracting means also has a rack shaped on the edge of said tray, and a gear engaged with said rack and driven by the motor installed on said disk-playing device. When said disk-playing device reaches the position corresponding to the pre-selected tray, said gear of said tray-retracting means starts to rotate by the rotation of said motor, then said gear drives said rack of said tray, said tray moves towards said disk-playing device, and finally said disk placed on said tray is automatically inserted into said device.

In this embodiment according to the present invention, in order to detect the stop position of said disk-playing device, a disk-playing device stop position detecting device comprised of a reflecting surface installed on each tray and an optical sensor to detect said reflecting surface are installed. When said disk-playing device arrives at the position corresponding to said pre-selected tray, said optical sensor detects said reflecting surface of said tray, and said disk-playing device stops at said position according to the signal sent from said sensor. Said tray then moves towards said disk-playing device, and said disk placed on said tray is pulled into said device, as previously described.

In this embodiment according to the present invention, said disk-carrying tray is composed of slide portions slidable in said storing portion of said stocker, a disk-carrying portion spaced between said slide portions, and a space exposing half of said disk. Accordingly, as said tray is able to approach said disk-playing device without interference with said disk tray-retracting means installed on said disk-storing portion of said stocker, it is possible to insert said disk into said turntable of said disk-playing device by pinching said disk between the ceiling plate and said roller mounted in said disk-playing device.

Also in this embodiment according to the present invention, said tray has a lever installed on the bottom surface thereof which has a boss insertable into the center hole of said disk, and a contact member enabling said boss to leave off from said center hole of said disk when said tray approaches the specified position. As said boss engages with said center hole of said disk while said tray is moving, said disk is securely positioned on said boss without any swaying, and when a cam surface mounted on the tip of said lever comes in contact with said contact member, said lever is pulled up and said boss leaves off from said disk.

Also in this embodiment according to the present invention, a pair of slide members are inserted into the guide grooves installed in said storing portion and slidably supporting said tray. Said slide members slide and forwardly feed said tray while sliding in said guide grooves. Accordingly, said tray is drawn out from said storing portion while doubly supported by said slides and said guide grooves of said stocker.

In this embodiment according to the present invention, said tray-retracting means is composed of said rack shaped on the side edge of each said tray, said pinion installed in each said stocker and engageable with said rack, a driving gear driven by said motor which-is installed on the under surface of said disk-playing device, an idling control gear which runs idly during the specified angle of rotation when engaged with said driving gear installed on said stocker or said disk-playing device, and therefore when said disk-playing device approaches the position of said pre-selected disk tray, as said driving gear installed on said disk-playing device engages with said pinion installed on said stocker through said idling gear idly running during the specified angle of rotation, it is possible to engage said pinion smoothly with said driving gear.

Further according to this invention, as a pair of said gears are chamfered fully on the facing gear profiles, it is possible to smoothly enter in engaging said gears in.

BRIEF DESCRIPTION OF THE DRAWINGS

The foregoing objects, features and advantages of the present invention as well as the presently preferred embodiments thereof will become more apparent from a reading of the following description in connection with the accompanying drawings in which.

DETAILED DESCRIPTION OF THE INVENTION

Figure 1:
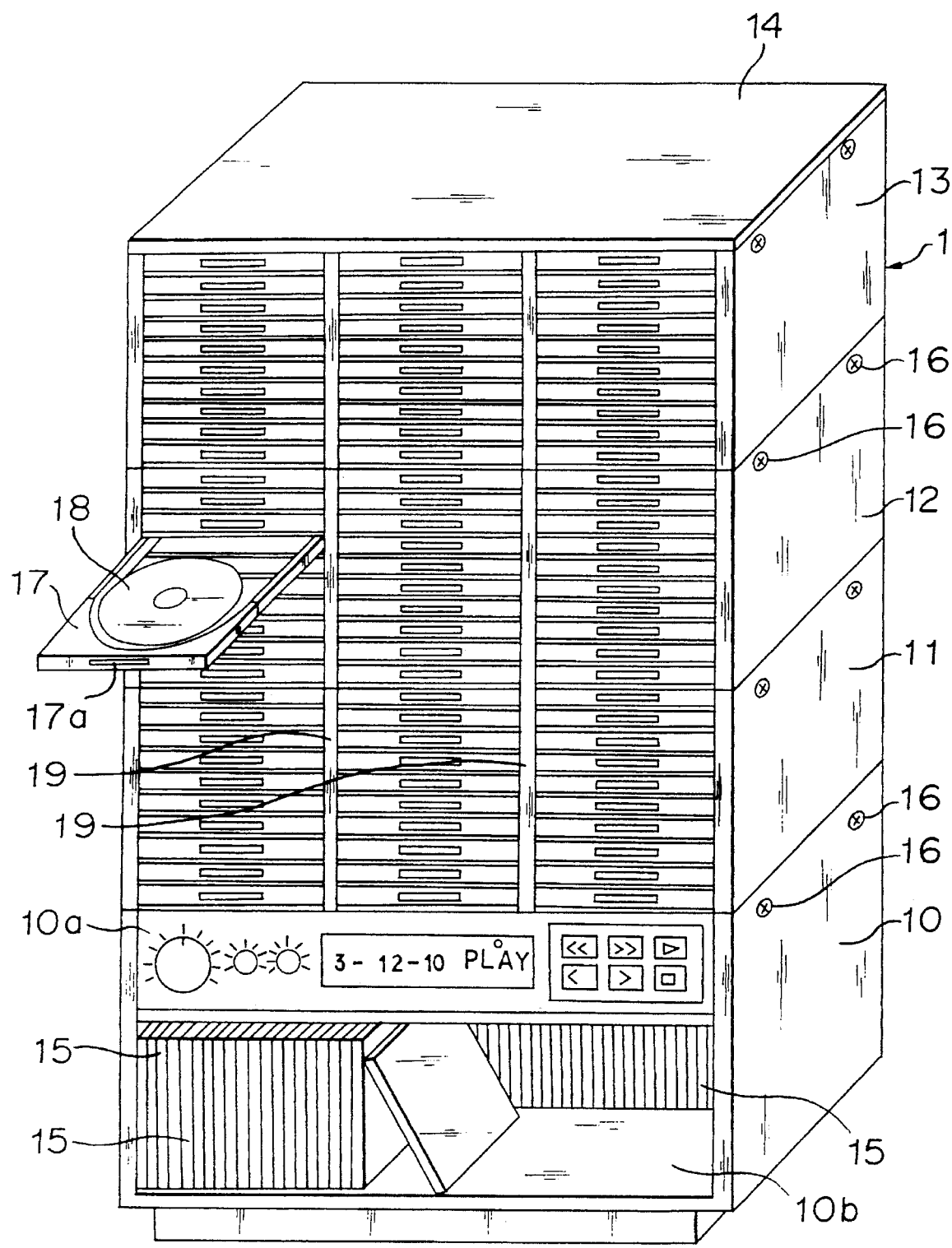
FIG. 1 is a perspective view of the disk player with an automatic disk exchanger according to this invention.

This invention is described practically and in detail with reference to the embodiments shown in the drawings as follows. FIG. 1 shows one embodiment according to this invention.

A disk player 1 is composed of a base box 10, having storage boxes 11, 12, 13 stacked on said base box 10 in series and a lid 14 mounted on the uppermost storage box 13.

The base box 10 is composed of said amplifying portion 10a containing electrical systems including a controller of said automatic disk exchanger and a control panel having adjusting knobs to control sound volume, sound level and the like on the front face thereof, and a storage shelf 10b for storing empty jackets 15 separated from said optical disk, located under said amplifying portion 10a.

Said storage boxes 11, 12 and 13 are detachably stacked on each other in series on said base box 10.

The storage boxes 11, 12 and 13 are able to be separated from each other by disengaging small set screws 16, and another storage box may be stacked on the storage box 13 by dismounting said lid 14. Applying this stacking method, it is possible to enlarge the disk-storing capacity.

A plurality of disk-carrying trays 17 having a grip 17a on the front faces thereof are inserted in each storage box 11, 12 and 13 (in this embodiment, 30 trays are inserted in each box). It is then possible to store each disk therein, by drawing out said tray 17 from said storage box, then placing said disk taken from its jacket on said tray 17, and pushing said tray 17 back into said storage box.

By affixing the indicator which displays the storage position on the front face of said tray 17, it is possible to move said disk-playing device to the position of the specified tray by inputting the contents of this indicator. These storage boxes 11, 12 and 13 shown in FIG. 1 are constructed the same as the storage boxes 20, 21 shown in FIG. 2. The aforementioned storage boxes 11, 12 and 13 are horizontally partitioned in 3 parts with two partition walls 19, and latter storage boxes 20, 21 are partitioned in 2 parts with a single partition wall 22.

Figure 2:
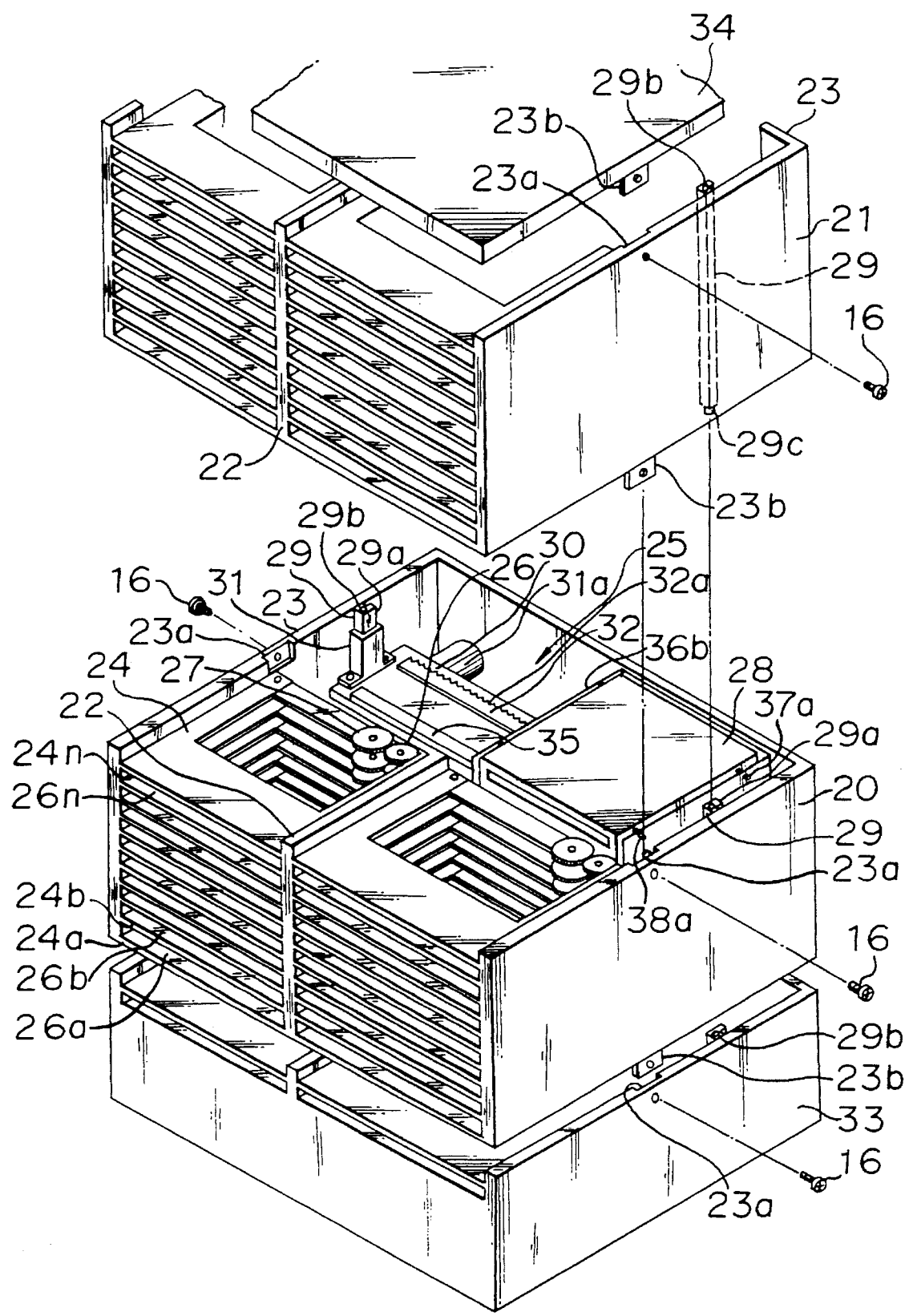
FIG. 2 is a exploded perspective view of the disk player with an automatic disk exchanger according to this invention.

In FIG. 2, said storage box 20 is composed with the stocker 24 installed on the open side of surrounding wall 23 shaped in the form of a channel, and an opening 25 is located behind said stocker 24. Said stocker 24 is divided into right and left portions with the partition wall 22, and each divided portion is further divided into a plurality of disk storing portions 26a, 26b , . . . 26n by multiple horizontal partitioning plates 24a, 24b , . . . 24n maintaining an adequate distance from each other. Each of these disk-storing portions 26a, 26b , . . . 26n is able to contain said disk-carrying tray 17.

Figure 3:
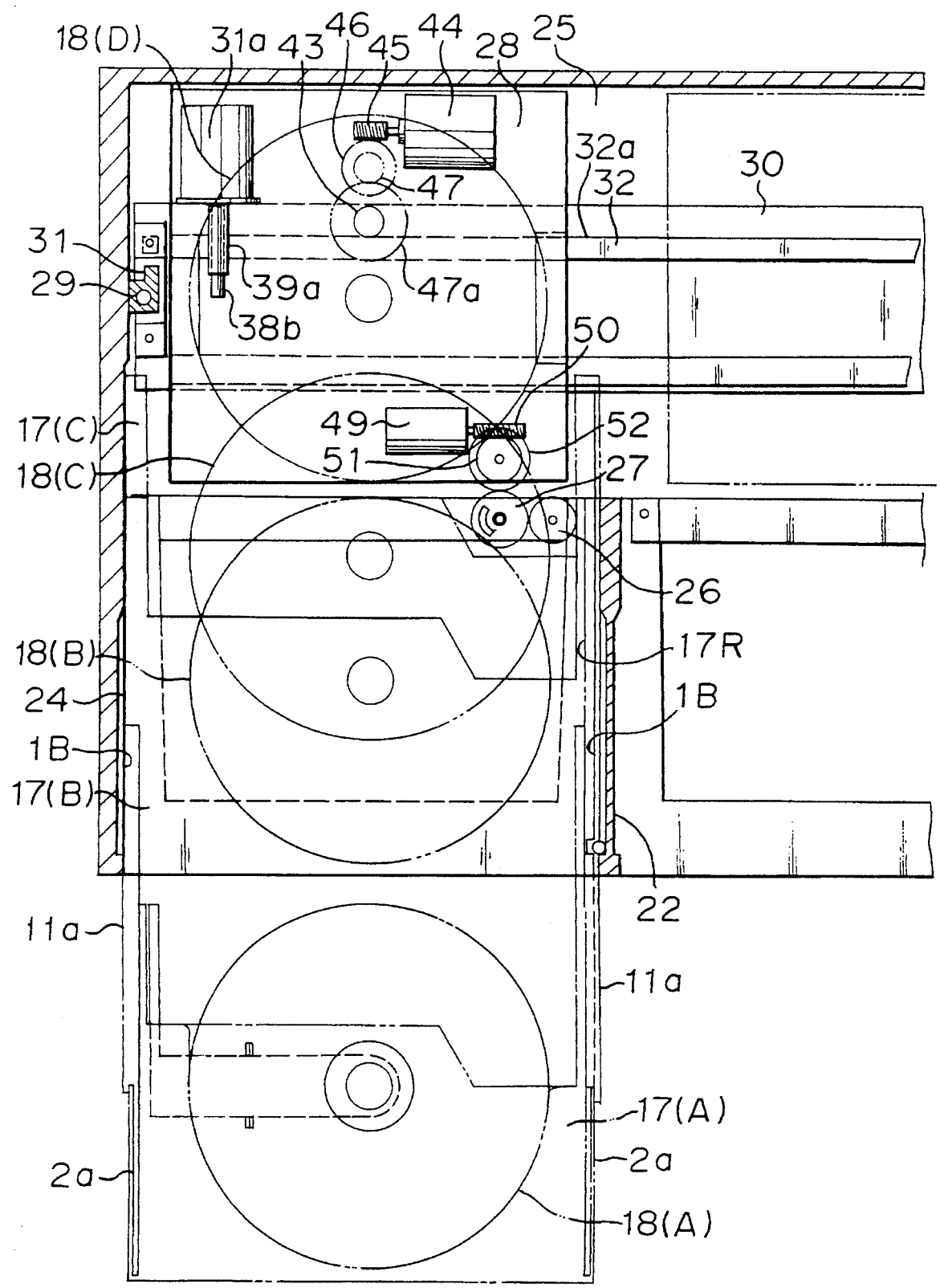
FIG. 3 is a working explanatory drawing of the disk player with an automatic disk exchanger according to this invention.
Figure 13:
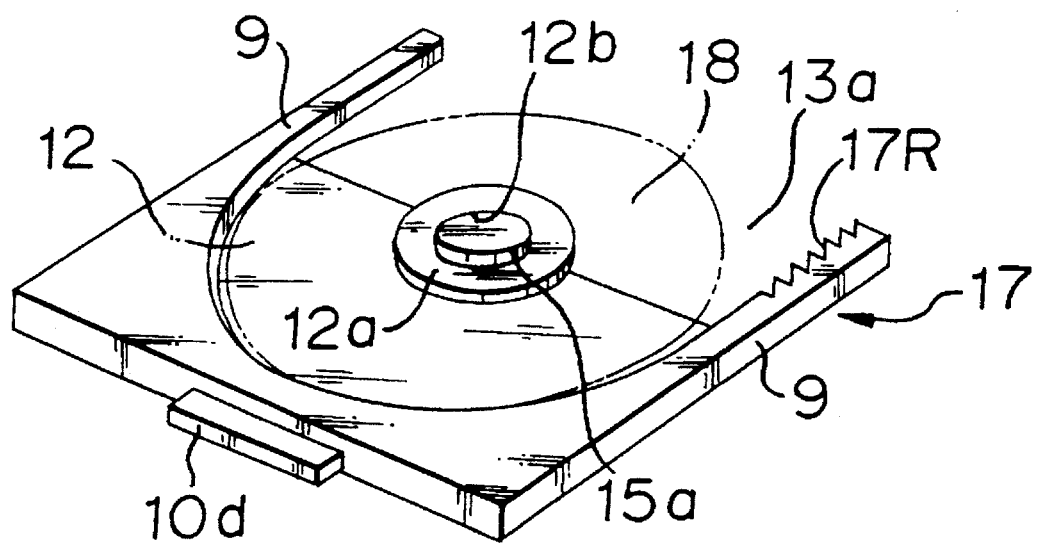
FIG. 13 is a perspective view of the one embodiment of the disk-carrying tray according to the present invention.

As shown in FIG. 3 and FIG. 13, on the inner edge of the right side leg extending from said tray 17 is shaped a rack 17R. The pinion 26 which engages with said rack, and tray-retracting gear 27 which engages with said pinion 26 are mounted on each corresponding horizontal partitioning plate 24a, 24b , . . . 24n.

The tray-retracting gear 27 composes tray-retracting means together with said rack 17R, said pinion 26 and the motor installed on the disk-playing device 28 as mentioned hereafter. By driving said tray-retracting means, it is possible to insert said tray 17 into said disk-playing device 28 to reach the specified position corresponding to a pre-selected tray, and to insert said disk 18 placed on said tray 17 into said disk-playing device 28.

Accordingly, in the above-described tray-retracting means, said means is driven by the motor 49 installed in said disk-playing device 28 through a wormwheel 51, a gear 52 integrated with said wormwheel, said tray-retracting gear 27, and said pinion 26. Of course, said means is not limited to said practice. For example, it may be possible to directly drive said gear 52 by said motor 49 without passing through said worm and worm wheel. Further, as shown in FIG. 10, it is also possible to compose said tray-retracting means with a rack 53 shaped on the under surface of said tray 17, a worm 55a fixed on a shaft 54a supported with said disk-playing device 28, a gear 56a on the other end of said shaft 54a, a gear 57a driven by the motor (not shown) installed under said device 28 moving vertically, and it is possible to prevent interference with this mechanism by disengaging said worm 55a from said rack 53.

The opening 25 openly faces each of said storing portions 26a, 26b , . . . 26n, and has a space enabling said device 28 to move vertically and horizontally therein, and upper and lower ends thereof which are completely opened.

Figure 8:
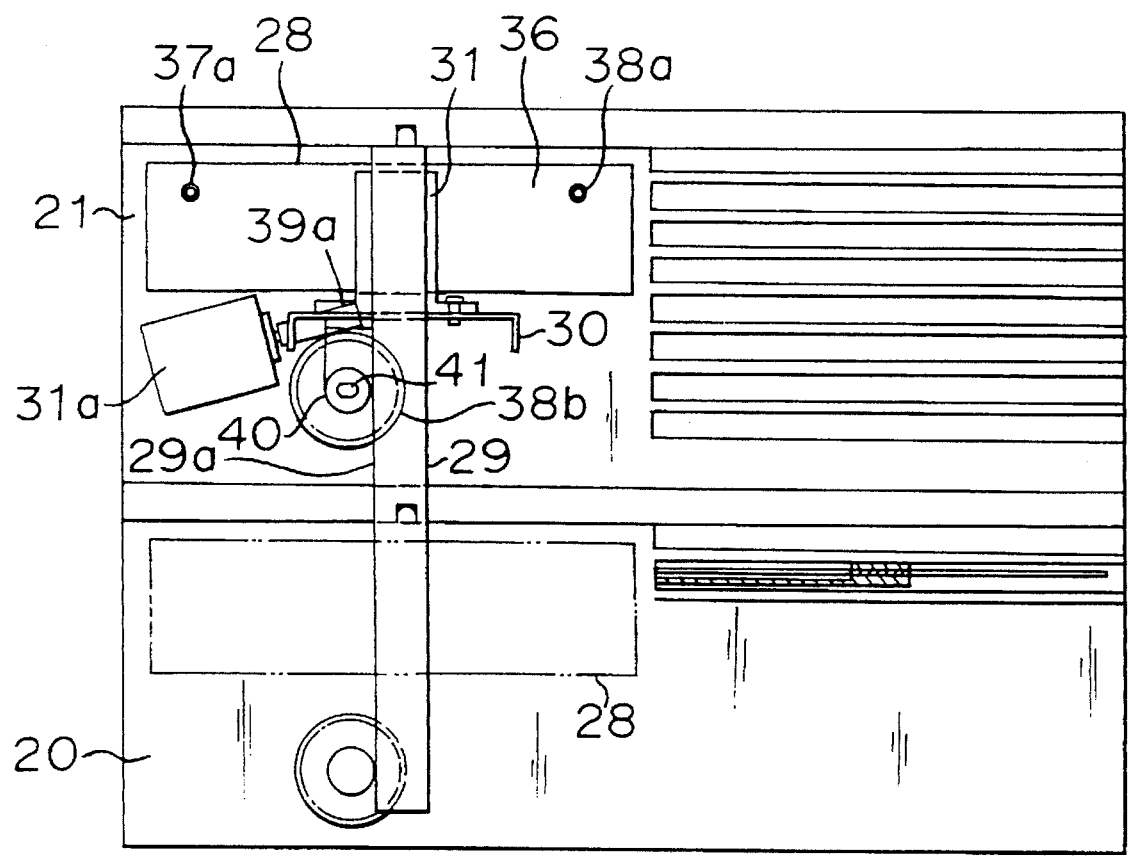
FIG. 8 is a working explanatory drawing of the disk player with the automatic disk exchanger as shown in FIG. 2.

On the left and right inner sides of said opening 25, rack members 29 having an L-type section are fixed, and racks 29a engaging with gears 40 travelling vertically are shaped thereon (see FIG. 8).

Figure 10:
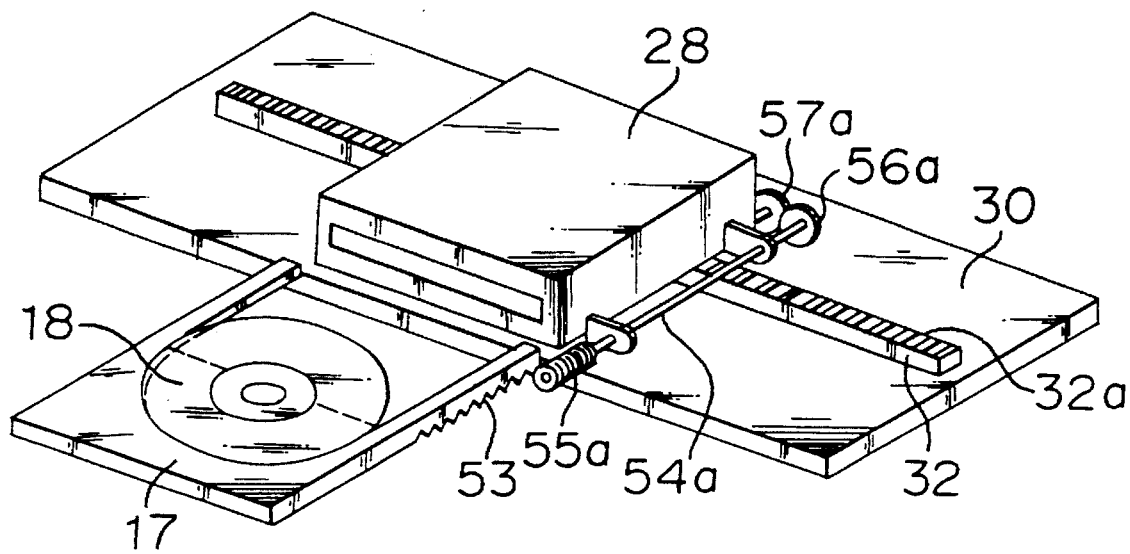
FIG. 10 is a perspective view of the embodiment of the player position-detecting mechanism installed in the disk-playing device of the present invention.

As shown in FIGS. 2 and 10, said disk-playing device 28 is mounted on a disk-playing device carrier 30. Said carrier 30 has a pair of sliders 31 sliding along said rack members 29 on both ends of said carrier, and vertically travelling gears installed on the back surface thereof, which vertically moves said carrier 30 along said rack members 29 by engaging with said vertically travelling gear.

The disk-playing device 28 mounted on said carrier 30 may also be moved horizontally by engaging the travelling gear 43 with a rack 32a shaped on a rack member 32 fixed on said carrier 30 as shown in FIG. 3 and FIG. 10. Said horizontally travelling gear 40 is installed on the bottom surface of said device 28, and driven by a motor 44 installed on the bottom surface of said device 28 through a worm 45, a worm wheel 46, gear 47 and gear 47a. FIG. 3 shows said device 28 reaching the far right side end of its horizontal travel.

As shown in FIG. 2, when stacking each storage box 20 and 21 on said base box 33, because it is necessary to position them to be aligned with each said rack member 29, each storage box 20 and 21 is stacked with inlaid design. In this embodiment, on the top edge surfaces of the side walls of said storage box 20, each concave 23a and 29b are shaped, and also on the bottom edge surfaces of the side walls of said storage box 21, corresponding convexes 23b and 29c are shaped.

By aligning said convexes and concaves, said stacked storage boxes 20 and 21 become correctly assembled and it becomes possible to smoothly transfer said carrier 30 into said storage box.

Also, since said base box 33 connected under said storage box 20 is also provided with concaves 23a, 23a and 29b, 29b, said storage box 20 is stacked on said base box 33 in the same manner that said box 20 is connected with said box 21.

Furthermore, said lid 34, having extrusions 23b, 23b on both sides thereof, is connected with said upper storage box 21 by aligning said extrusions 23b, 23b with the concaves 23a, 23a shaped on the top ends of both side walls of said storage box 21. Said fittings are also fixed with small screws 16.

Furthermore, as shown in FIG. 2, a guide member 35 fixed on said carrier 30 guides said disk-playing device 28 to travel to the left and right.

The disk player having an automatic disk exchanger is composed by stacking a plurality of said storage boxes on said base box, as described above. The operation of said player is next described with reference to FIG. 3 and FIG. 4 as follows.

The disk 18(A) removed from its jacket is placed on said tray 17(A) extruding from said stocker 24 (see FIG. 1) and then said tray 17(A) is again pushed into said stocker portion 24, until finally said disk 18(B) is stored in said tray 17(B) as shown in FIG. 3.

The disk-playing device 28 mounted on said carrier 30 is able to travel vertically and horizontally in said opening 25 according to the signals from said amplifying portion 10a enclosed in said base box 33 and arrive at a specified position corresponding to the pre-selected tray 17.

The up-and-down travelling motion of said disk-playing device 28 is performed by driving said gear 40 installed under the surface of said carrier 30 and engaged with rack 29a of said rack member 29.

As shown in FIG. 8, said gears 40, 40 are installed to engage with said rack 29a, 29a shaped on said rack member 29, 29 fixed on both side walls of said opening 25 of each storage box, and said gears 40, 40 are connected to a connecting rod 41 so as to be harmonized. Said gears 40, 40 are integrated with the worm gear 38b engaging to worm 39a driven by the motor 31a installed on the bottom surface of said carrier 30. By the reversible revolution of said motor 31a, said carrier 30 is able to move up and down. As each rack member 29 of said storage box 20 and 21 is continuously connected, said carrier 30 is smoothly transferred between said boxes.

In addition, said disk-playing device 28 moves horizontally on said carrier 30 by driving said gear 43 engaged with said rack 32a fixed on said rack member 32. Said gear 43 is installed on the bottom surface of said disk-playing device 28, and is driven by the motor 44 mounted on the bottom face of said device 28 through the worm 45 and the worm gear 46.

Namely, said disk-playing device 28 is able to move to the position corresponding to the pre-selected tray by the vertical travelling of said carrier 30 and the horizontal travelling of said disk-playing device 28 itself, as mentioned above.

Then, as shown in FIG. 3, when said disk-playing device 28 reaches the specified position, the gear 52 driven by the motor 49 installed on the bottom surface of said device 28, engages with said tray-retracting gear 27.

In this state, when said motor 49 starts to rotate according to the signal from said amplifying portion 10a installed in said base box 33, said tray-retracting gear 27 begins to rotate, said tray 17(B) is drawn towards said device 28 and into the position as shown in the position of tray 17(C), then said disk 18(C) placed on said tray 17(C) is inserted into said device 28 by the loading mechanism installed in said device 28, and finally placed in the playable position therein shown as disk 18(D).

After playing, said disk 18(D) placed in said device 28 is extracted externally by said loading mechanism, and is transferred to said waiting tray 17(C), and said disk 18(B) is held in the tray 17(B) extracted from said stocker 24 by the reverse revolution of said tray-retracting gear 27.

As described above, by applying this invention, it becomes easy to store said disk by placing it in said tray like a drawer and, furthermore as a large number of said disks are stored in said stocker having multiple storing portions, it is also possible to store them in good order.

Furthermore, according to this invention, as it is possible to play said disk from its stored condition, a series of steps including the removal of said disk from said jacket and its placement into said disk-playing device are eliminated, and since it is possible to consecutively play many disks contained in a plural of storage boxes, the pleasure of using said disks is greatly increased.

Figure 4:
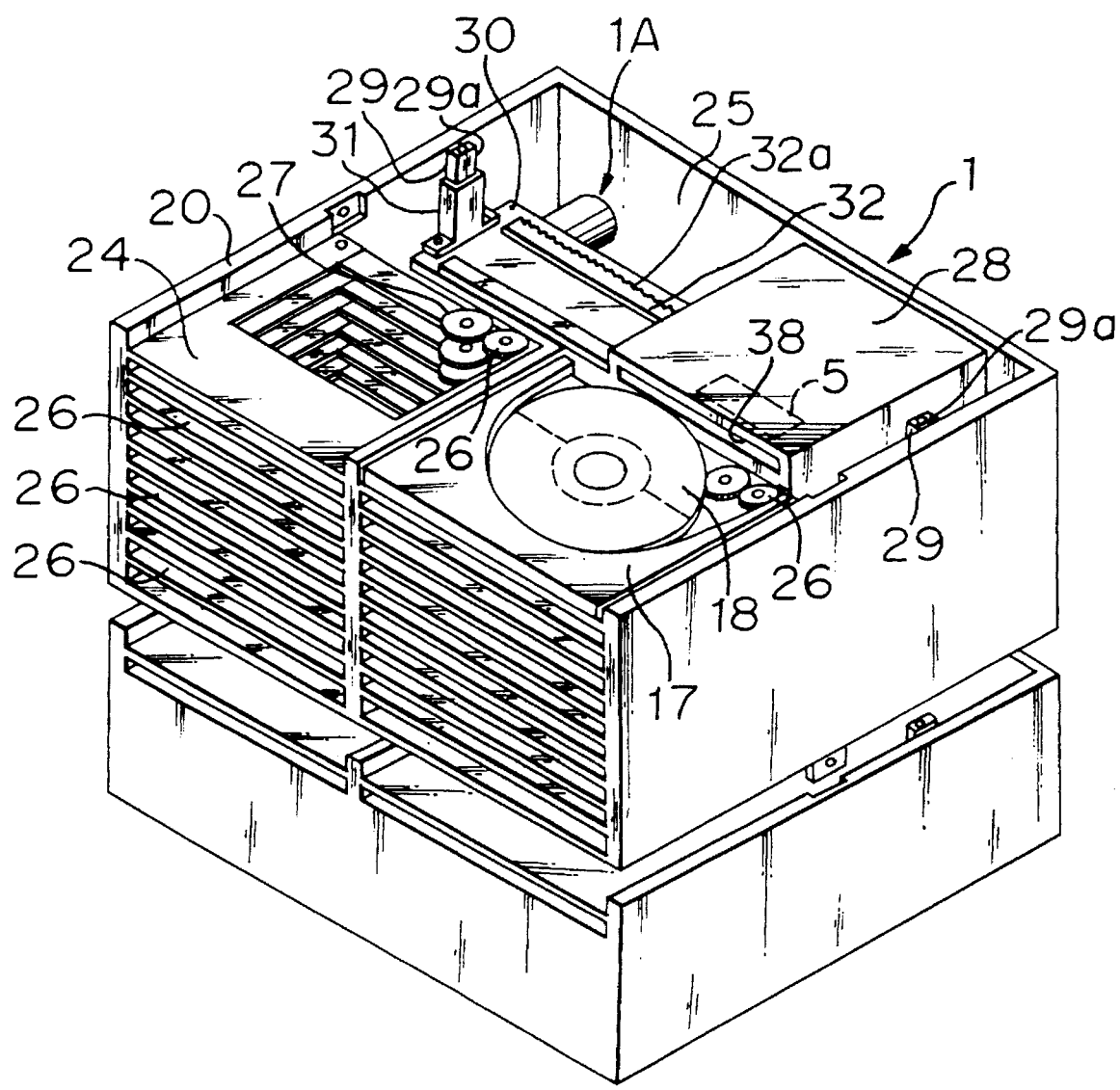
FIG. 4 is a perspective view of one embodiment of the disk player with an automatic disk exchanger having a disk-feeding mechanism.

In FIG. 4, another embodiment according to this invention is shown. This disk player 1 is composed of a single storage box 20 having a storing portion 26 for storing aforementioned disk trays 17 having said disk 18 thereon, and an opening 25 placed behind said box 20, having a device enabling said disk-playing device 28 mounted on a carrier 30 to move vertically and horizontally in said spaced portion in the same manner as the previously described embodiment.

In each storing portion 26, the aforementioned tray-retracting gear 27 is installed, and by driving said gear 27, said disk tray 17 placed in said portion 26 is transferred into said disk-playing device 28, and said disk placed on said tray 17 is inserted into said device 28.

Each opened end of said storing portion 26 faces said opening 25. Said opening 25 has a space enabling said device 28 to move horizontally and vertically therein, and both the upper and lower ends thereof are opened. On the inner faces of each side wall of said opening 25, said rack members 29, 29 are fixed, and also racks 29a, 29a are shaped on said member 29, 29, as previously described.

The disk-playing device 28 moves horizontally on said carrier 30 which moves up and down in said opening 25. Said carrier 30 has sliders 31, 31 which slide along said rack members 29, 29 placed on both side ends of said spaced portion. Said carrier 30 moves vertically by the rotation of said vertical moving gears 40, 40 engaged with said racks 29a, 29a shaped on said rack members 29 and 29. Said gears 40, 40 are driven by the motor 31a installed on the bottom surface of said carrier 30.

Figure 5:
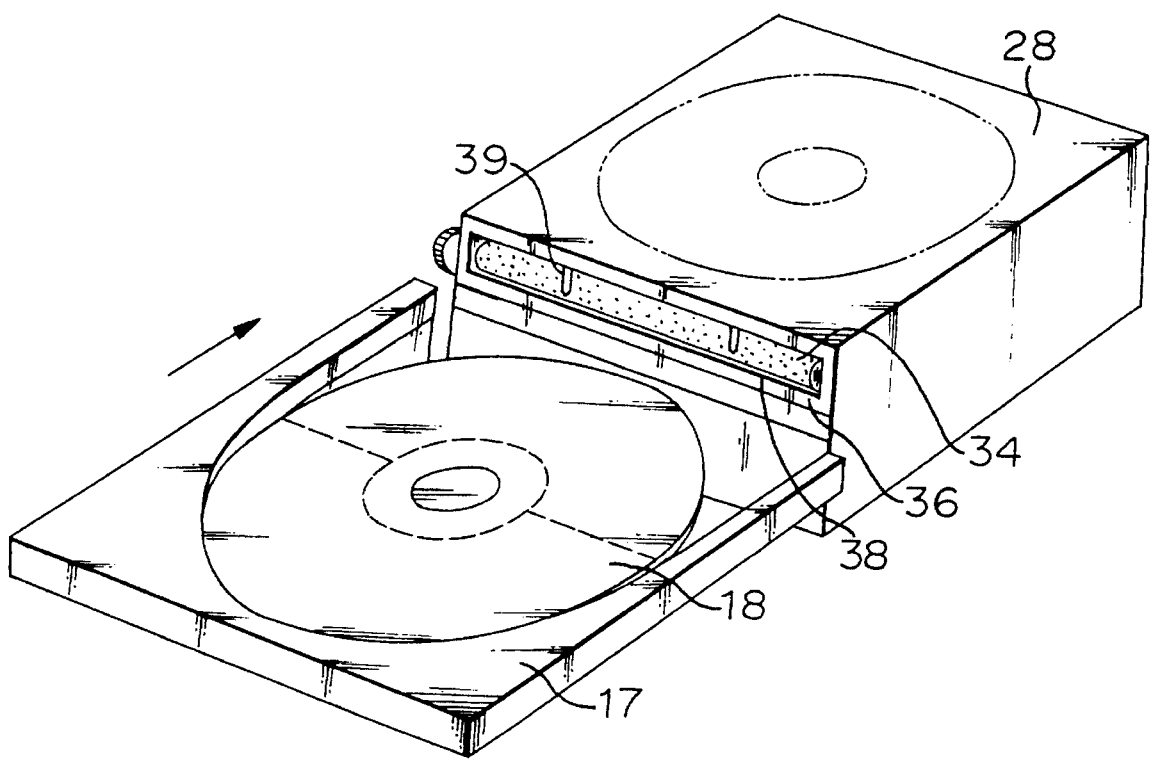
FIG. 5 is an enlarged perspective view showing the disk-feeding mechanism according to the embodiment of this invention shown in FIG. 4.
Figure 6:
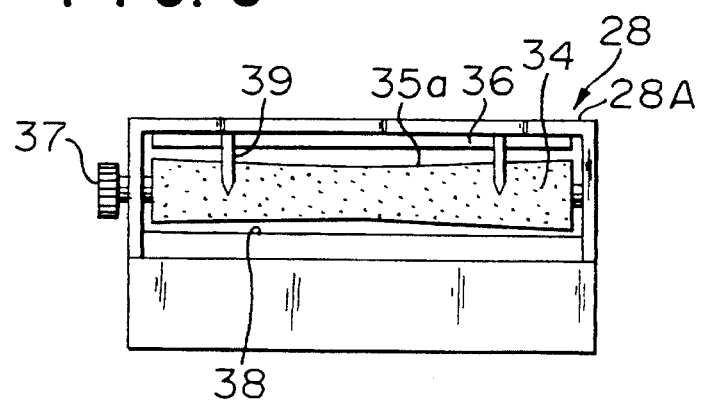
FIG. 6 is a front view of the essential parts of the embodiment shown in FIG. 5.

As shown in FIG. 5 and FIG. 6, in the entrance port 38 of said device 28, a rubber roller 34 is installed against a smooth plastic guide plate 38 installed on the lower face of the ceiling plate 28A of said device 28. Said rubber roller 34 has a small diametral portion at the central portion 35a, and is tapered towards both ends thereof, and said rubber roller 34 comes in contact with the peripheral edge of said disk having no recorded portion.

At the shaft end of said rubber roller 34, one gear 37 is installed, and by driving said gear 37 connected to the motor installed in this device 28 (not shown), said rubber roller 34 rotates. Two disk-detecting fingers 39, 39 are installed on said ceiling plate 28A of said disk entrance port 38 so as to be slidable along said port 38.

When said tray 17 nears said device 28, and said disk-detecting fingers 39, 39 moves as much as a specified distance after engaging with said disk 18, a detecting switch connected to said fingers 39, 39 activates said motor to drive said rubber roller 34.

The disk-detecting means is composed of said disk detecting fingers 39, 39 and said detecting switch (not shown). When the front edge of said disk 18 comes into contact with the center portion of said rubber roller 34, said disk 18 is inserted into said device 28 being held between said guide plate 36 and said rubber roller 34. Thereafter, said disk 18 is placed on the turntable (not shown) of said device 28.

After playing, said disk is transferred into said tray 17 through said disk entrance port 38 by the reverse rotation of said motor.

As mentioned above, by providing said rubber roller and said disk-detecting means, it becomes possible to automatically insert or remove said disk placed on said tray into said device 18, and accordingly to select any disk from a large number of disks placed on said trays and to play said disks while also keeping costs low and construction simple.

Figure 7:
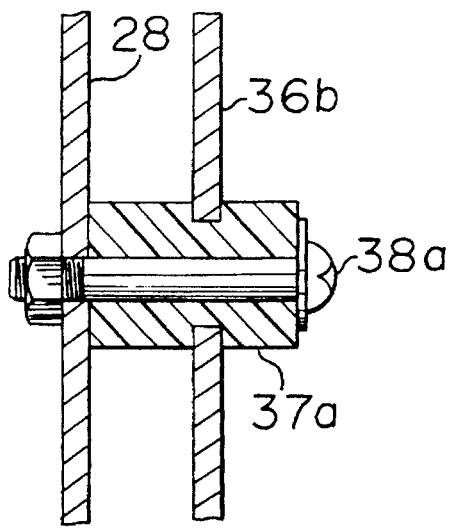
FIG. 7 is a sectional view of the essential parts of the disk player with an automatic disk exchanger as shown in FIG. 2.

As shown in FIG. 2, said disk-playing device 28 is mounted on said carrier 30 through chassis 36b in a vibration-preventing way. As shown in FIG. 2 and FIG. 7, on the side walls of said chassis, cylindrical vibration-preventing members 37a made of an elastic body such as silicon rubber are mounted, and said disk-playing device 28 is supported by supporting pins 38a penetrating said vibration-preventing members 37a.

Figure 9:
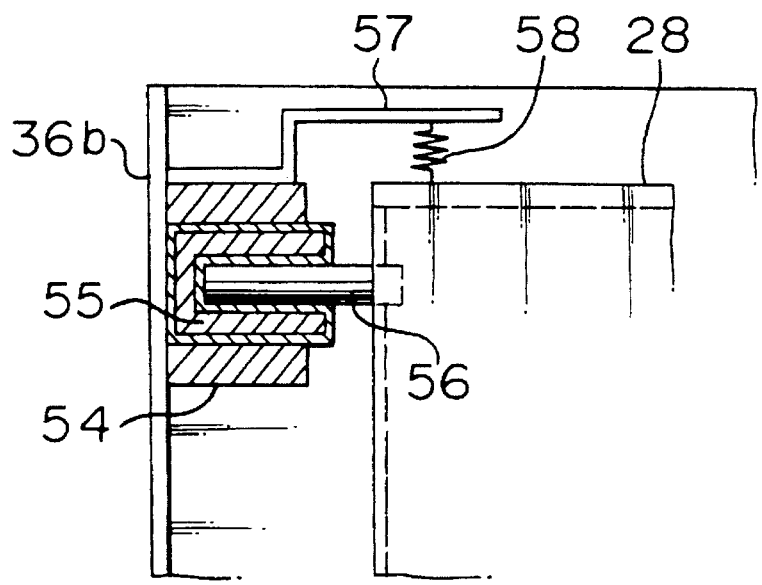
FIG. 9 is a sectional view of the essential parts according to another embodiment of the disk player with an automatic disk exchanger.

An alternative vibration-preventing method is also applicable. As shown in FIG. 9, on the side wall near the corners of said chassis 36b, cylindrical holders 54 made of engineering plastic are installed, and cylindrical vibration-preventing members 55 made of an elastic material such as silicon rubber are inserted in said holders 54.

On the other hand, supporting pins 56 extruding from the side walls of said disk-playing device 28 are inserted into said vibration-preventing members 55, and between piece 57 extending from said chassis 36b and said device 28, a plurality of tension springs 58 are installed.

As mentioned above, by providing vibration-preventing materials between said device 28 and said chassis 36b, it is possible to absorb externally inflicted vibrations or shocks.

Figure 11:
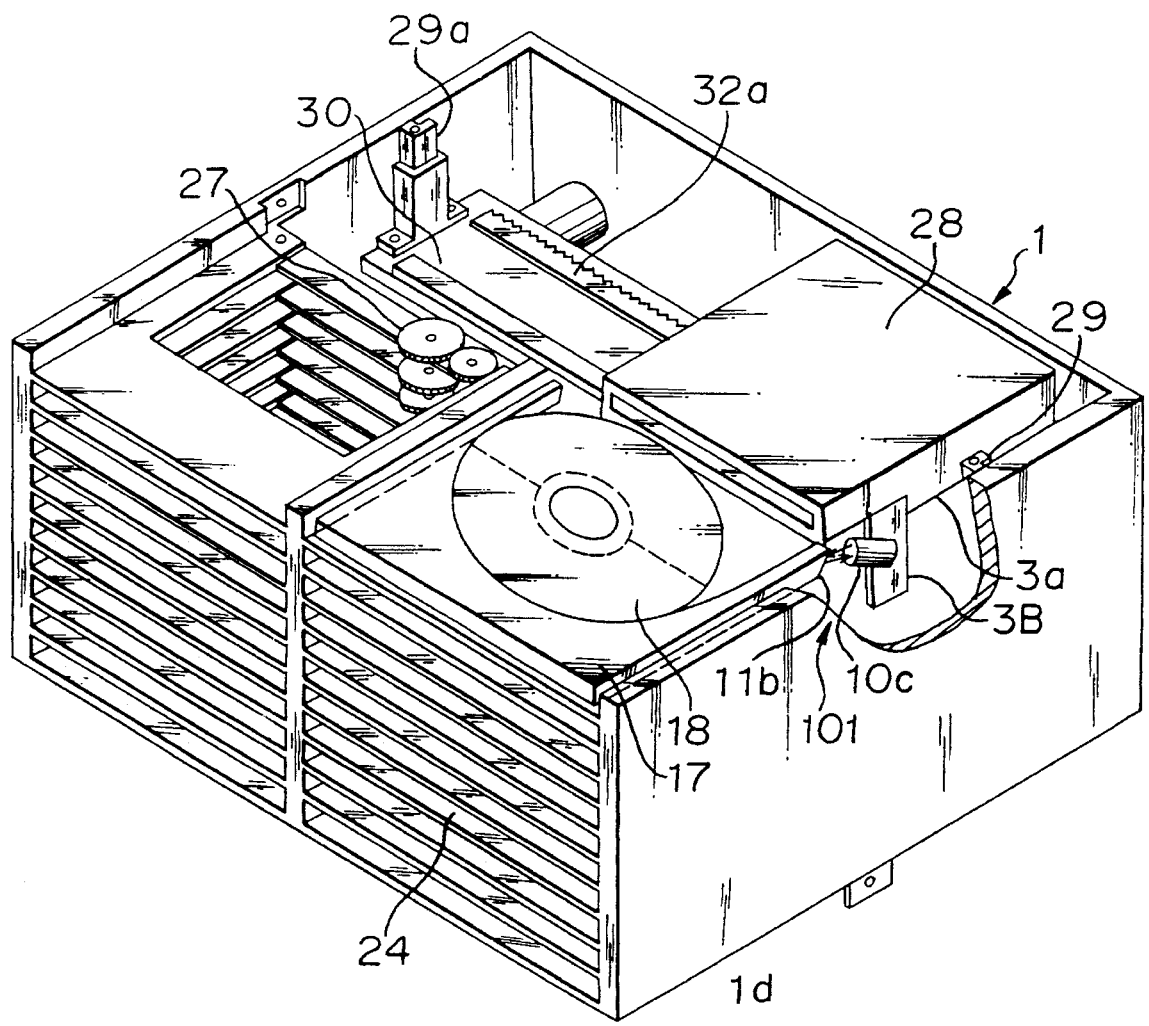
FIG. 11 is a perspective view of the embodiment of the player position-detecting mechanism installed in the disk regenerating device of the present invention.
Figure 12:
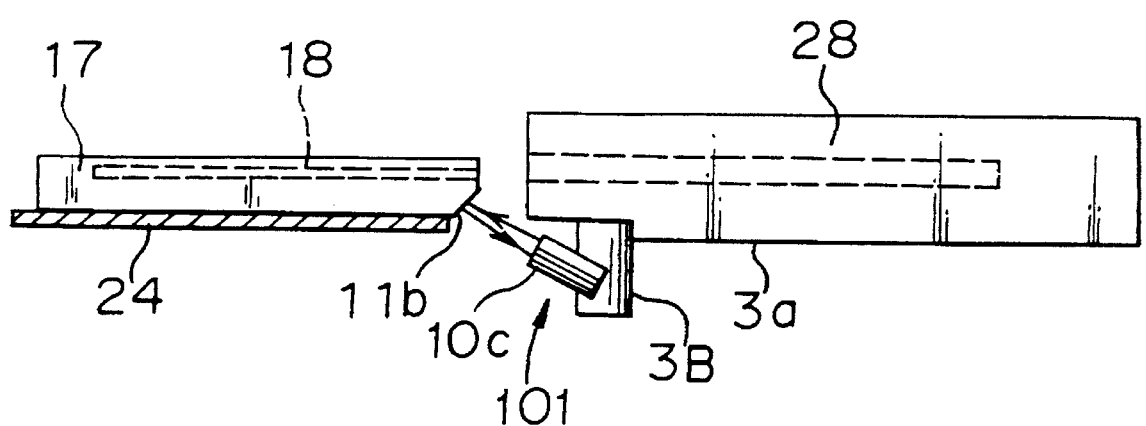
FIG. 12 is a side view of the embodiment shown in FIG. 11.

A disk-playing device stop position-detecting mechanism 101 is shown in FIG. 11 and FIG. 12. This mechanism 101 detects when said disk-playing device 28 reaches the specified position corresponding to said tray 17 having a pre-selected disk 18, and stops the movement of said device 28. In FIG. 12, the light emitting and receiving sensor 10C having a light-emitting element and a light receiving-element is installed on the bracket 3B mounted on the bottom 3a of said disk-playing device 28. In addition, on the lower portion of the end edge of said tray 17 against said device 28, the tapered reflecting face 11b is shaped. Said sensor 10c detects this face 11b. As said disk-playing device 28 moves horizontally left and right along said rack 32a, and moves vertically up and down along said rack 29a, when said device 28 reaches the position of the tray 17 having pre-selected disk 18, said optical sensor 10b detects said reflecting face 11b of said tray 17, the detecting signal stops said device 28, and said tray 17 then advances towards said device 28 by the rotation of said gear 27, and finally said pre-selected disk is fed into said device 28.

Figure 14:
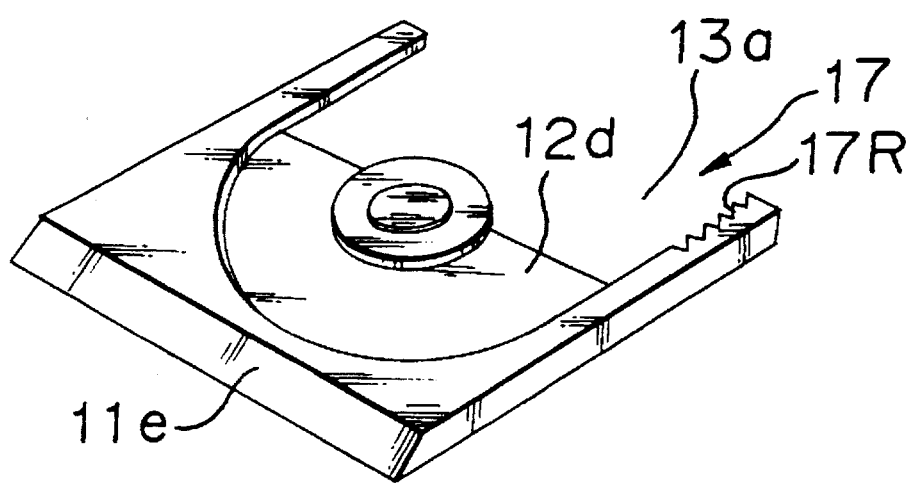
FIG. 14 is a perspective view of another disk tray different from FIG. 13.

As shown in FIG. 13 and FIG. 14, said disk tray 17 has slide edges 9 sliding between said inner sides of said stocker 24, and said rack 17R shaped on the inner side of said edge 9 engages with said gear 26 driven by the motor 49 installed on the bottom surface of said device 28 (see FIG. 3). Said disk tray 17 has a handle on said front surface. Said handle may have different shapes as shown in FIG. 13 and FIG. 14. Said disk tray 17 has a concaved disk-mounting portion 12 having a slightly larger diameter than that of said disk 18 and the upper half portion thereof between said side edges is cut out for pushing said disk 18 into said device 28. The center portion 12a of said disk-mounting portion 12 is extruded slightly upward to support the central portion of said disk 18.

Furthermore, the center portion of said portion 12a is bored and the circular extrusion 15a is mounted upwardly from the under sides, and said extrusion 15a engages with the center hole of said disk.

Half of said disk-mounting portion 12d facing said device 28 is cut out for disposing the bottom side of said disk 18 and for preventing interference with said gear 27. This cut-out portion is shown in FIG. 13 and FIG. 14 with the numeric 13a.

When playing said pre-selected disk 18 by applying this disk player 1 adopting the above-mentioned disk tray 17 said automatic disk exchanger first receives instructions to move said device 28 to the position corresponding to said specified stocker 24.

After said motion is completed, as shown in FIG. 3, said motor starts, and said disk tray starts to move towards said disk entrance port 38 of said device 28 by said rack 17R of said tray 17 and said gear. With this motion, said exposed portion of said disk 18 engages with said running rubber roller 34 (shown in FIG. 6) installed in said device 28, then said disk 18 is pulled into said device 28.

In this case, said gear 27 does not interfere with said disk tray 17.

After said disk 18 is pulled into said device 28, the ensuing operations proceed following the conventional automatic disk exchanger.

As described above, in this embodiment, said disk 18 placed on said disk tray 17 is able to be transferred on the turntable of said disk-playing device 28 simply by forwarding said disk tray 17 towards said disk-playing device 28.

Accordingly, in order to put said disk into said rubber roller, it is not necessary to move said disk placed on said disk tray towards said disk-playing device, or to lift up said disk from said disk tray as conventionally applied.

It therefore becomes possible to simplify construction, to decrease accidents resulting from mechanical complexity, and to dramatically increase the reliability of the entire system.

Figure 15:
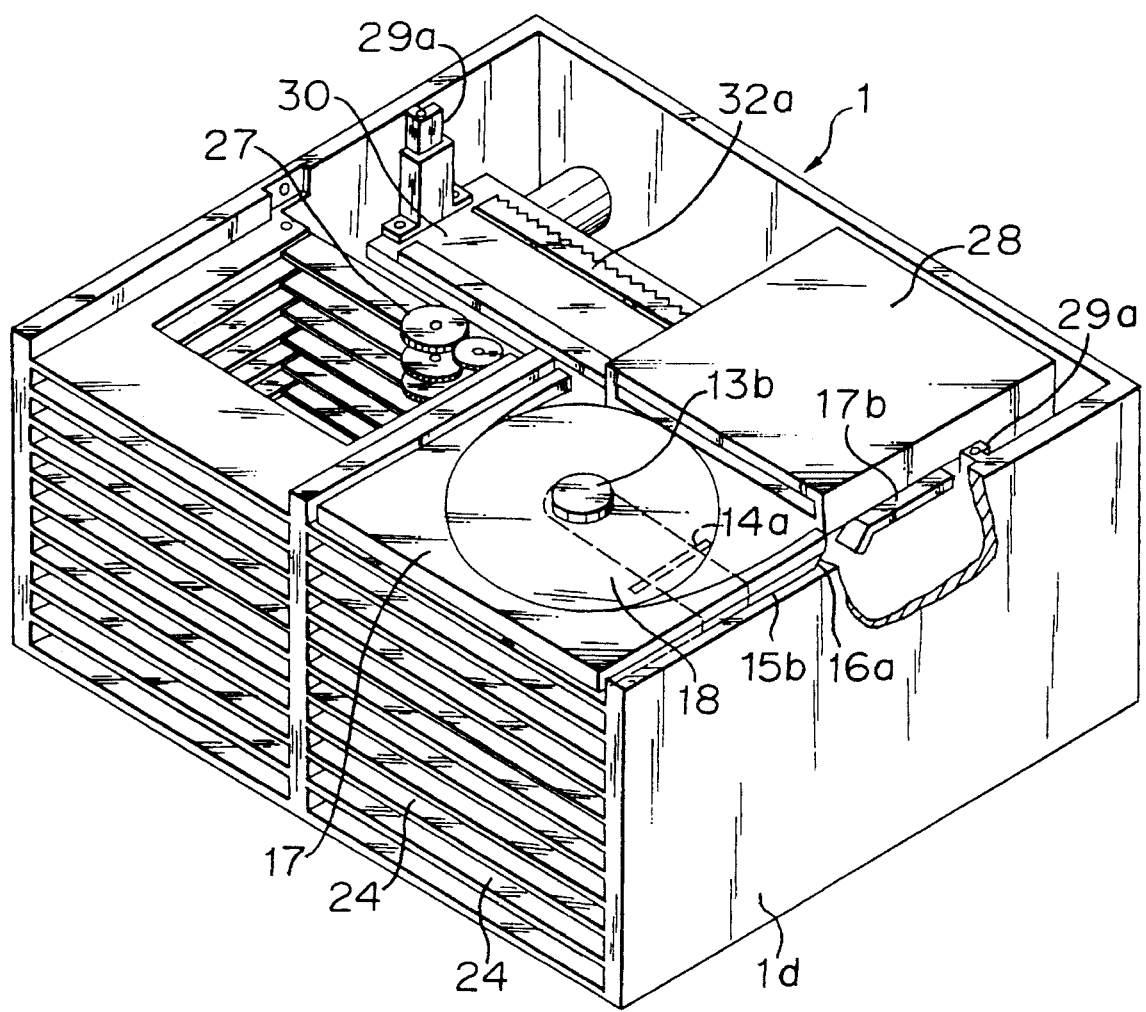
FIG. 15 is a perspective view of one embodiment of the tray mechanism of the disk-playing device according to this invention.
Figure 16:
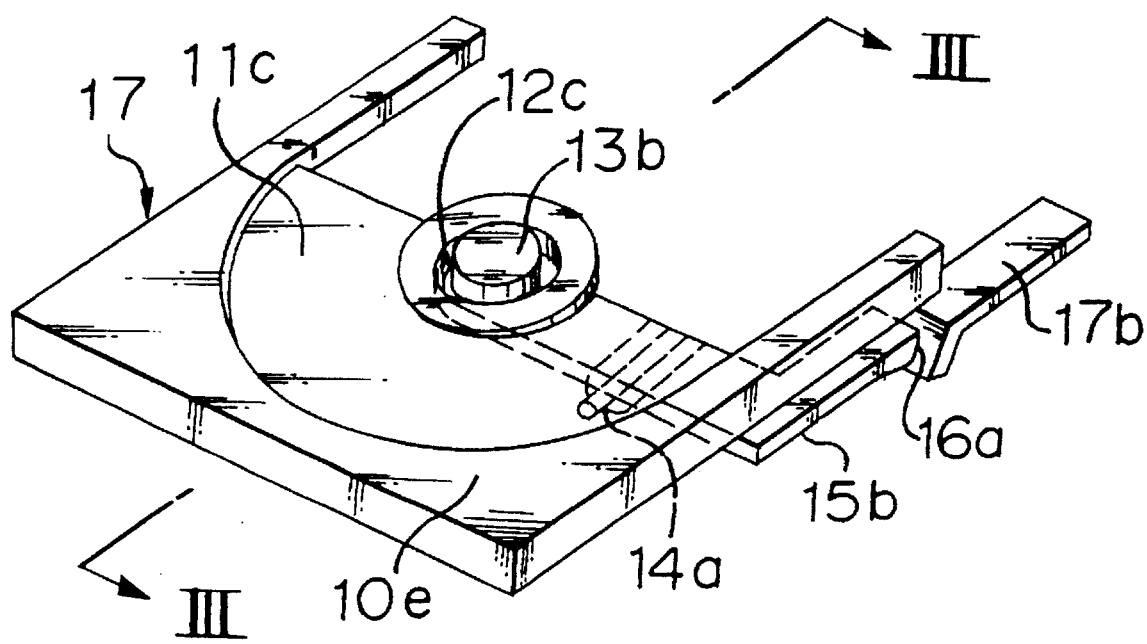
FIG. 16 is a perspective view of the tray mechanism of the embodiment shown in FIG. 15.
Figure 17:
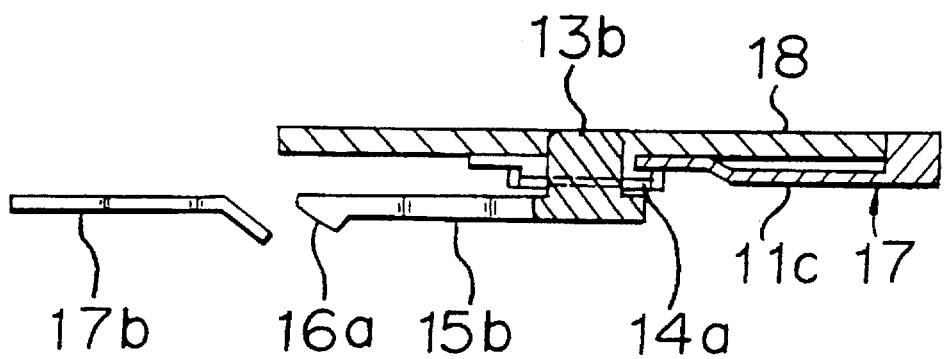
FIG. 17 is a sectional view along line III—III of FIG. 16.

As shown in FIG. 15, FIG. 16 and FIG. 17, said tray 17 has a central hole 12C, and a boss 13b retractively placed in this hole 12c for positioning said disk 18. Said boss 13b is mounted on the L-type lever 15b supported on the bottom surface of said tray 17 with a pin 14a.

One cam face 16a is shaped on the tip of said lever 15b. Said disk-playing device 28 has a contacting member 17b on the lower portion of the side surface thereof, and said contacting member 17b comes in contact with said cam surface 16a of said tray when said device 28 stops at the specified position and said tray 17 moves towards said device 28.

As shown in FIG. 17, as normally the portion of said cam face 16a is heavier than the portion of said boss 13b, said boss 13b extrudes upwardly in said hole 12c of said tray 17. Accordingly said boss 13b engages with said center hole of said disk 18 when said disk 18 is placed on said disk tray 17.

When said device 28 stops at the position corresponding to the pre-selected disk, said tray 17 carrying said pre-selected disk moves towards said device 28 as previously mentioned. When said cam face 16a of said lever 15b comes in contact with said connecting member 17b, said member 17b pulls up said cam face 16a, said boss 13b moves downwardly, and said disk 18 is inserted into said device 28. Accordingly, said disk 18 is stably supported on said disk tray 17 while said tray 17 is transferred, and said disk 18 is automatically transferred into said device 28.

Figure 18:
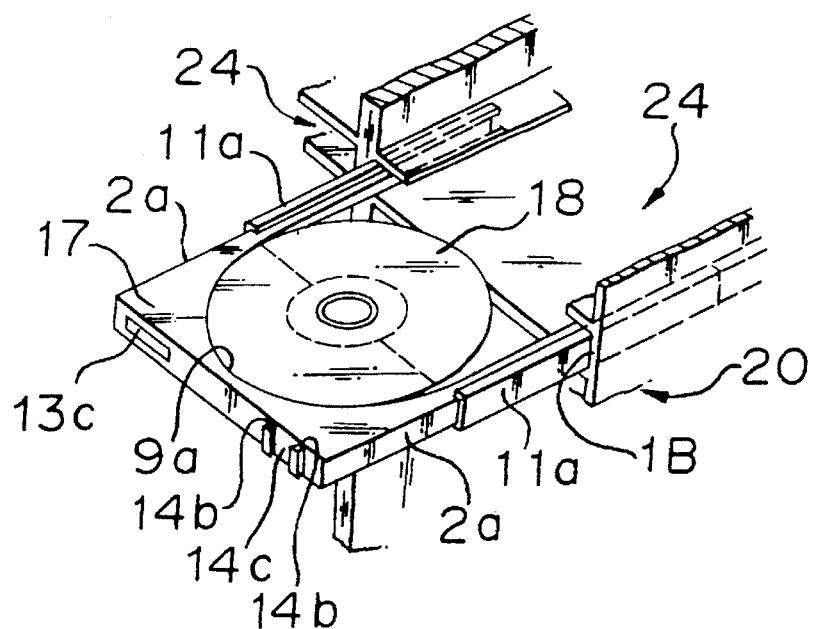
FIG. 18 is a perspective view showing engagement of the disk tray with the opening of said stocker.

As shown in FIG. 18, said disk storage box 20 is composed of a multiple of trays 17 each having a disk 18 to be transferred into said disk-playing device 28, guiding grooves 1B shaped on both sides of said stocker portions 24 towards the front and back, and sliding pieces 11a having a channel-shaped section.

As shown in FIG. 18, said tray 17 has a semi-circular concave 9a a little larger than the diameter of said disk 18 at the front half portion thereof and two side edges 2a, 2a extending from said front half portion each separated by the diameter of said concave 9a.

The disk 18 is put on said concave 9a.

The disk tray 17 is slidable between said sliding pieces 11a. The sliding pieces 11a have a length equal to the depth of said disk tray 17. Accordingly, when said disk tray 17 is pulled out entirely from said stocker 24, as shown in FIG. 3, a half portion of said sliding piece 11a is pulled out from said stocker 24, and the remaining half portion thereof supports said pulled-out disk tray 17, then it is possible to prevent the dropping of said tray 17 from said stocker 24. Accordingly, it is possible to safely and easily exchange said disk 17 with another one.

It is further possible to display the title or the content of said disk 18 installed on said tray 17, by attaching a label card on the concaved face 13c on the front surface of said tray 17, or by inserting a label card into the insertion portion 14c installed on the front surface thereof. As mentioned above, by applying these sliding pieces 11a, there is no need to elongate the length of said tray 17, and it is possible to minimize the depth of said disk player and the installation space required.

Figure 19:
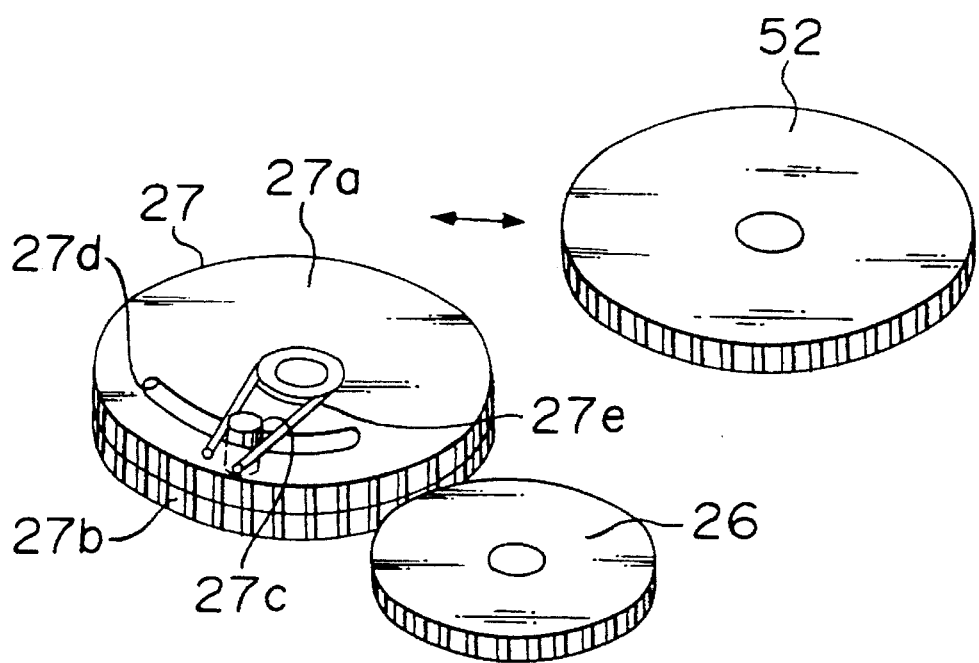
FIG. 19 is an exploded perspective view of the essential parts of the disk player with the automatic disk exchanger shown in FIG. 2.
Figure 20:
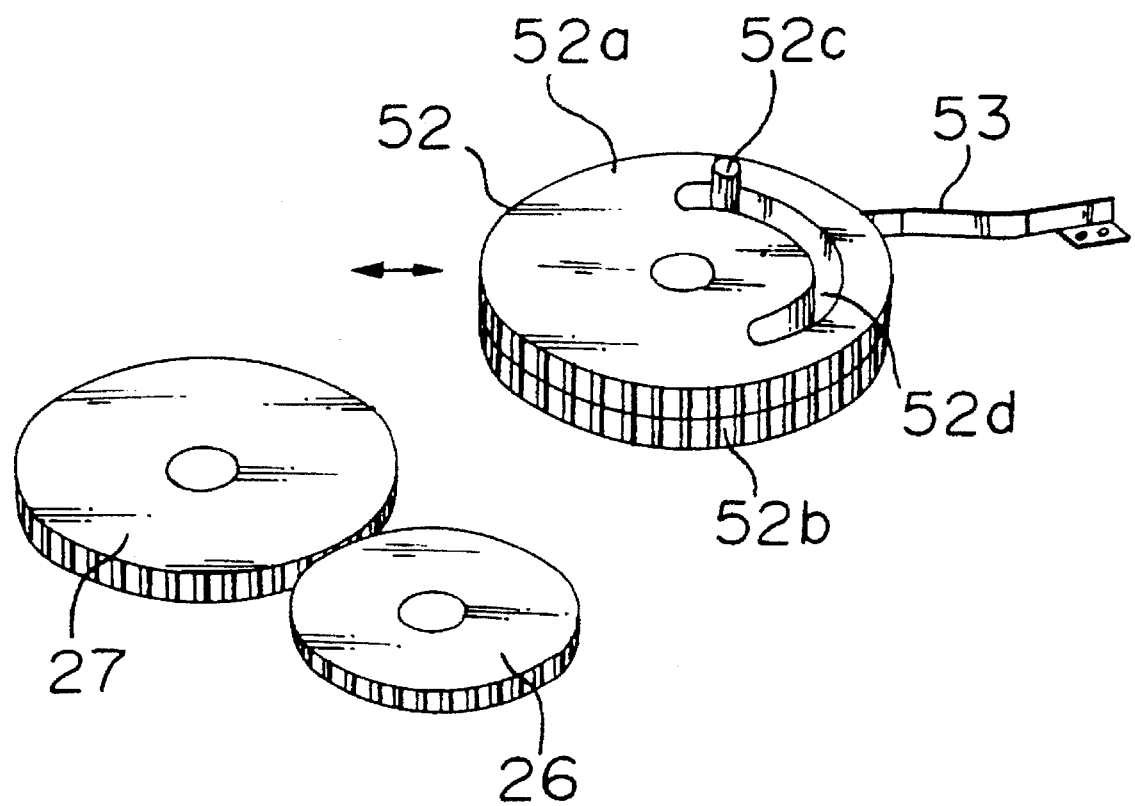
FIG. 20 is an exploded perspective view of the essential parts of the other disk player with the automatic disk exchanger.

In FIG. 2, 3, 8, 19, and 20, each horizontal partition plate 24a, 24b, ... 24n constructing each said storing portion 26a, 26b, ... 26n has a pinion 26 engaging with said rack 17R shaped on the inner side of said disk tray 17, and said tray-retracting gear 27 engaging with said pinion 26. Said tray-retracting gear 27 is composed of tray-retracting means with said rack 17R, said pinion 26 and the motor 49 mounted on said disk-playing device 28. As shown in FIG. 19, said gear 27 is composed of the first gear 27a having an idling mechanism and the second gear 27b piled on each other. Said first gear 27a not engaging with said pinion 26 has a circumferential long groove 27d, and the pin 27c extruded from the second gear 27b is engaged with said long groove 27d of said first gear 27a. Furthermore, said pin 27c is maintained in the middle portion of said long groove 27d with a U-shaped spring 27e mounted on said gear shaft.

By driving said gear 27, it is possible to move said tray 17 towards said device 28, and to transfer said disk 18 mounted on said tray 17 into said device 28.

As mentioned before, when said disk-playing device 28 reaches the position corresponding to the pre-selected tray, the gear 52 coaxially installed on the worm wheel 51 engages with said first gear 27a.

The gear 52 is driven by the motor 49 installed on the bottom surface of said disk-playing device 28 through the worm 50 installed on the output shaft of said motor 49, and said worm wheel 51.

By engaging said gear 52 to said first gear 27a, as shown in FIG. 19, the driving force of said gear 52 is transmitted to said secondary gear 27b after idling said first gear 27a having said long peripheral groove 27d, and the engaging of said gear 52 against said secondary gear 27b progresses smoothly. Said motor 49 then starts to rotate after the starting signal from said amplifying portion 10a which is contained in said base box 33 (shown in FIG. 2).

The tray 17(B) is then inserted into said device 28 and said disk 18(C) is transferred into said device 28.

As an alternative method of this idling mechanism of said gear 27a, said gear 52 may be constructed so as to be divided into a first gear 52a facing said groove 52d and a second gear 52b having a pin 52c.

In this case, a plate spring 53a mounted on said travelling bed 30 is engaged to said first gear 52a.

Further modifications are shown in FIG. 21 to FIG. 26 referring to the engaging of said driving gear 52 to said gear having the idling portion.

Figure 21:
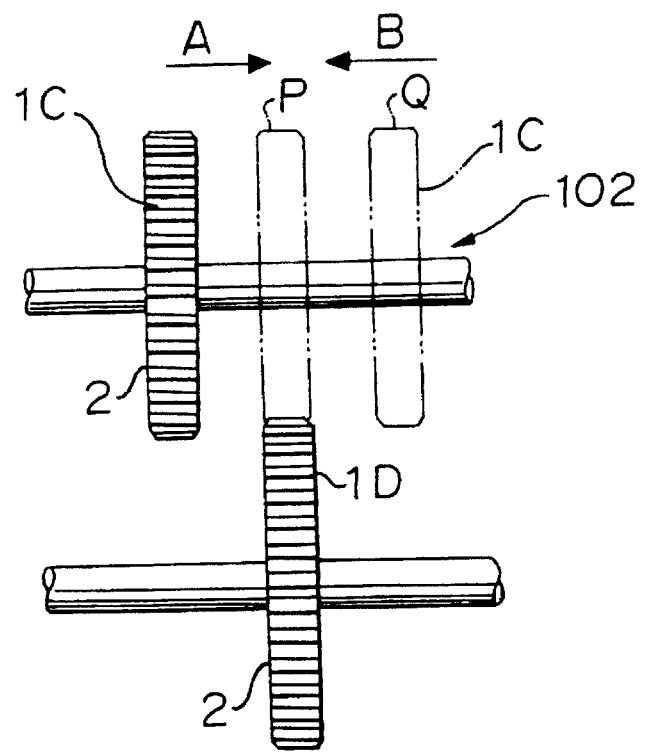
FIG. 21 is a front view of the gear mechanism according to this invention.

As shown in FIG. 21, one gear 1c of a gear mechanism 102 comprising said gear 1C and another engageable gear 1D, moves towards arrow "A" and engages with said gear 1D at point P, and a gear 1C located at point Q also moves towards arrow "B" and engages with said gear 1D at point P.

Figure 22:
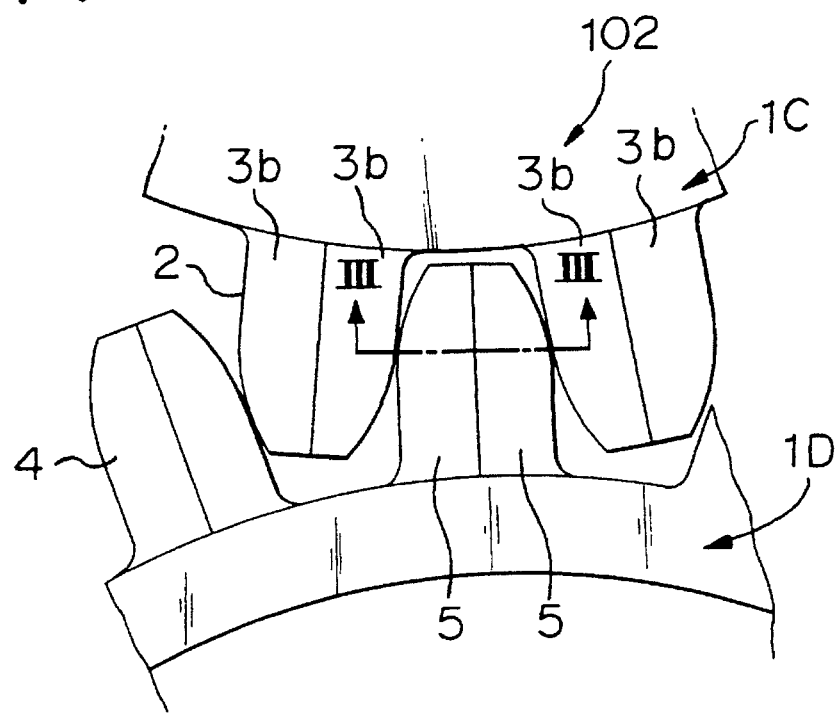
FIG. 22 is a side view of the essential parts of the embodiment shown in FIG. 21.
Figure 23:
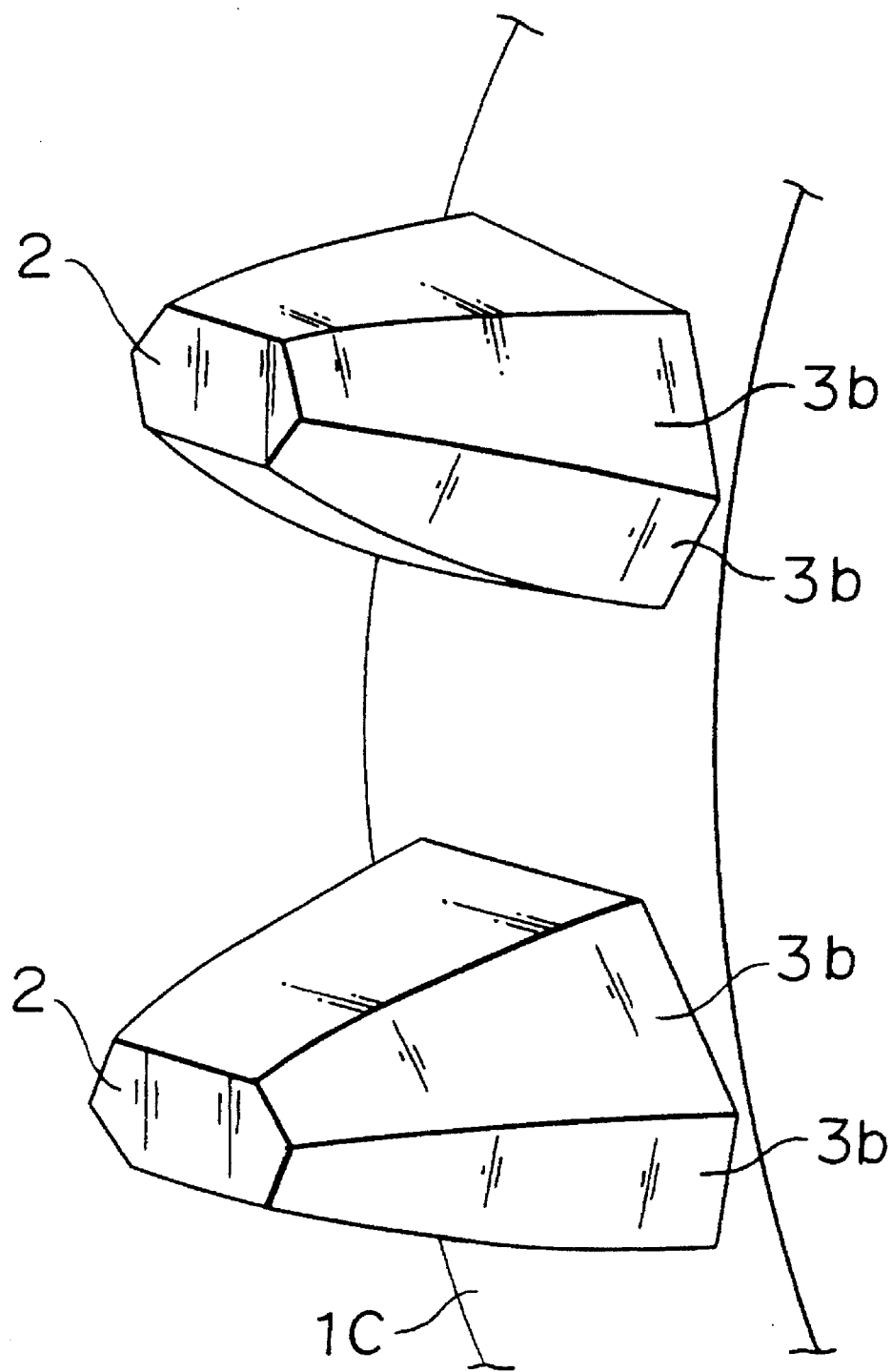
FIG. 23 is a perspective view of the embodiment shown in FIG. 21.
Figure 24:
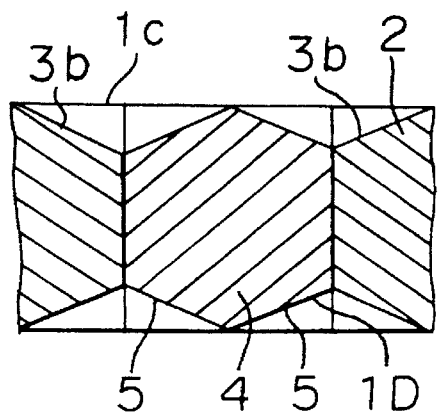
FIG. 24 is a sectional view along line III—III of FIG. 22.

In FIG. 22 said gears 1C and 1D are shown while contacting. The tooth profile 2 of said gear 1C is chamfered to maintain tapered surfaces 3b, 3b, and the tooth profile 4 of said gear 1D is also chamfered to maintain tapered surfaces 5, 5. These tapered surfaces 3b, 3b and 5, 5 are shaped as shown in FIG. 23 and FIG. 24.

Figure 25:
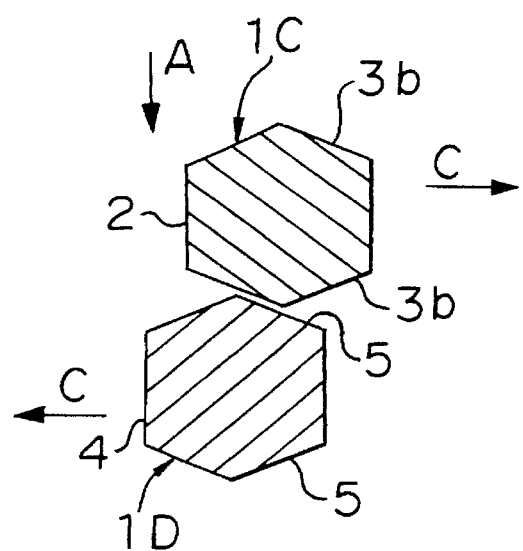
FIG. 25 is a sectional view before engagement of the gear mechanism shown in FIG. 21.

As shown in FIG. 25, when said gear 1C moves towards direction "A" to engage with said gear 1D, as said tapered surface 3b of said gear 1C and said tapered surface 5 of said gear 1D push one another, it becomes possible to engage them smoothly.

Figure 26:
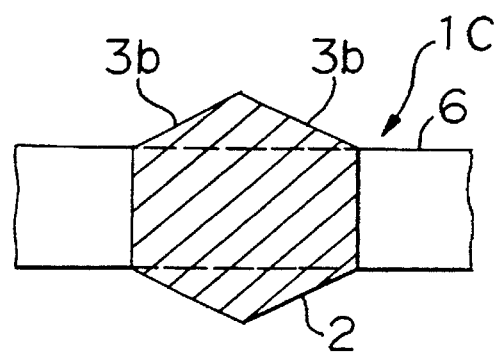
FIG. 26 is a sectional view of the other embodiment of the gear mechanism according to this invention.

In FIG. 26, as another embodiment, the gear 1C is shaped so that the teeth surfaces chamfered 3b, 3b extrude from the gear body 6.

What is claimed is:

1. A disk player with a front facing control panel for preselecting stored disks, and for automatic disk selection, comprising a plurality of stackable disk storage boxes with front and rear areas, and having at least one pair of multiple stages for storing disks one above the other on disk-carrying trays in disk-storing portions of said storage boxes having front access for ease of loading and changing disks by a user of said disk player, and rear access for playing one of said disks; each said tray being substantially U-shaped with a semi-circular shaped disk-mounting portion for supporting in place at the front area of said boxes a disk stored thereon, and each said disk-carrying tray having an opening at the rear area thereof; said openings at the rear areas facing a clear space extending throughout the total height of the storage boxes, and each storage box having a pair of rack members on the inner side surfaces of each said storage box forming continuous guide tracks; and said disk player including an electrical-mechanical system for powering said disk player and transferring sequentially a disk to and from a disk-playing device; said disk stackable storage boxes being stacked atop one another in alignment with a base box; a carrier, supporting said disk-playing device, vertically moveable through said clear space along said continuous guide tracks formed by said pairs rack members; each of said disk-storing portions having one of said disk-carrying trays and a disk-carrying tray retracting means; and said disk playing device mounted on said carrier so as to move both vertically in said clear space, and horizontally from right to left and vice-versa along the rear areas of said at least one pair of multiple stages of said storage boxes to respective positions corresponding to preselected stored disks, and being adapted for playing sequentially each preselected disk transferred from a disk-carrying tray in any one of said storage boxes to said disk-playing device, whereby said disk player is adapted to play automatically a continuous series of preselected disks in a manner similar to that of a "conventional juke box" playing in series a plurality of preselected records.

2. The disk player having the automatic disk exchanger recited in claim 1, further including: a roller installed near an entrance port of said disk player; and a disk-retracting mechanism having a disk-detecting means for driving said roller after detecting insertion of said disk-carrying tray into said entrance port of said disk player.

3. The disk player having the automatic disk exchanger recited in claim 2, wherein each said disk-storing portion including:

a pair of guide grooves installed on both sides of the entrance port of said disk-storing portion; and a pair of slide members retractably inserted in said guide grooves so said disk-carrying tray may be fully pulled out.

4. The disk player having the automatic disk exchanger recited in claim 1, wherein said disk player is supported by a chassis including members made of vibration-preventing material.

5. The disk player having the automatic disk exchanger recited in claim 1, wherein said disk-playing device is provided with a device for stopping at a position corresponding to a pre-selected disk-carrying tray, and said device comprising:

an inclined reflecting surface shaped on a lower portion of a back edge surface of said disk-carrying tray; and a stop position detector mounted on a bottom portion of a side wall of said disk-playing device, for detecting said reflecting surface directed towards said disk-playing device.

6. The disk player device having the automatic disk exchanger recited in claim 1, wherein said disk-carrying tray comprises:

a pair of edge portions slidable in guide grooves provided on said storage boxes;

a disk-playing portion cut out in the form of a semi-circle so as to avoid interference with said tray retracting means; and a rack portion engaging with a pinion installed in each of said disk-storing portions of storage boxes.

7. The disk player having the automatic disk exchanger recited in claim 1, wherein each said disk-carrying tray is characterized by a disk-holding device, comprising;

a lever swingably installed on the bottom surface of said disk-carrying tray, having a boss extruding from a standard center hole of said disk placed on said tray; and a contact member installed on a lower portion of a side face of said playing device, for enabling said boss to come free from said center hole of said disk when said disk-carrying tray approaches said disk playing device by said contacting member coming into contact with said lever of said disk-carrying tray.

8. The disk player having the automatic disk exchanger recited in claim 1, including driving means enabling said playing device carrier to move vertically in said openings of said stacked storage boxes, comprising:

a pair of rack members fixed on the inner sides of said openings of said stacked storage boxes;

a driving shaft installed on an under surface of said playing device carrier;

a pair of pinions mounted on each end of a driving shaft for engagement with said rack members;

a worm wheel mounted on said driving shaft for driving said shaft; and a worm wheel mounted on a motor shaft, and said motor being installed on a bottom surface of said playing device carrier for driving said worm wheel.

9. The disk player having the automatic disk exchanger recited in claim 1, wherein said tray-retracting means comprises:

a rack shaped on one side of said disk-carrying tray;

a pinion installed in each said storing portion;

a driving gear driven by a motor installed on said playing device; and an idling gear having an idling mechanism, installed on either of said stocker portions or said playing device and engaged with either said pinion or said driving gear.

10. The disk player having the automatic disk exchanger recited in claim 9, wherein said driving gear and said idling gear are chamfered for facilitating engagement.

11. The disk player having the automatic disk exchanger recited in claim 1, wherein said disk player is expandable by stacking at least one additional storage box atop said plurality of disk stackable storage boxes.

12. The disk player having the automatic disk exchanger recited in claim 11, wherein a lid is attached to said at least one additional storage box so as to provide a finished top cover to said disk player.

13. The disk player having the automatic disk exchanger recited in claim 1, further including a base box supporting said stackable storage boxes.

14. The disk player having the automatic disk exchanger recited in claim 13, wherein said base box having at least some components of said electrical/mechanical system.

15. The disk player having the automatic disk exchanger recited in claim 13, wherein said base box further including a control panel having means for preselecting a disk from any storage box, sound level and volume, on/off switch and other controls.

16. The disk player having the automatic disk exchanger recited in claim 13, wherein said base box including means for storing empty jackets of said disks placed in the trays of said disk player.

17. The disk player having the automatic disk exchanger recited in claim 13, wherein said base box is aligned with said stackable storage boxes.

* * * * *